(No Model.)
F. DE FOREST.
FISH HOOK.
No. 264,256. Patented Sept. 12, 1882.
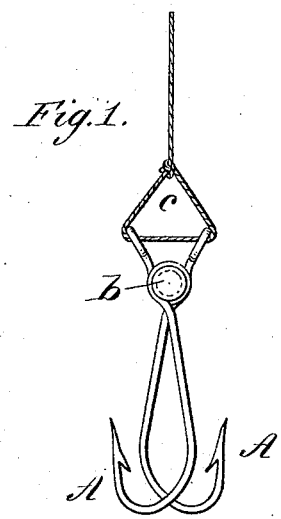
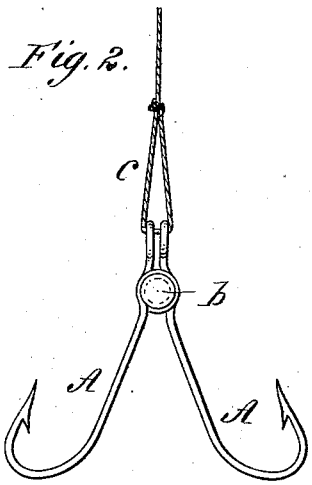
WITNESSES:
INVENTOR:
BY
ATTORNEYS.

UNITED STATES PATENT OFFICE.

FRANK DE FOREST, OF DE SOTO, MISSOURI.

FISH-HOOK.

SPECIFICATION forming part of Letters Patent No. 264,256, dated September 12, 1882.

Application filed June 22, 1882. (No model.)

To all whom it may concern:

Be it known that I, FRANK DE FOREST, of De Soto, Jefferson county, Missouri, have invented a new and useful Improvement in Fish-Hooks, of which the following is a full, clear, and exact description.

My invention consists in the jointed double hook hereinafter described and claimed. It is adapted especially for catching bass, catfish, salmon, or other fish that will take a bait of sufficient size for holding the hooks together.

Reference is to be had to the accompanying drawings, forming part of this specification, in which similar letters of reference indicate corresponding parts in both figures.

Figure 1 is an elevation of my improved hook, showing the same in the position as baited; and Fig. 2 shows the hook as it would be spread by drawing on the line.

A A are two hooks, of suitable size and of about the ordinary form. These are jointed together near their upper ends by bending around the pin b, so that the barbed ends of the hooks may open and close. The shanks of the hooks are formed with eyes, as usual, for receiving the line shown at c, which line passes through both eyes, so that when it is drawn upon the upper ends of the hooks are brought together and the barbs spread.

In using this hook the bait is placed upon the two barbs, as illustrated, minnows or other bait material being used of sufficient size and solidity, so that when placed upon the hooks it shall retain the barbed ends together. When baited in this manner the hooks will be retained together, so that they cannot separate by being drawn through the water; but when taken by the fish and the line drawn upon the barbs are instantly spread and the fish thus securely caught without danger of its getting loose.

This double hook is durable, not liable to become broken, and inexpensive, and for certain kinds of fish it is of superior efficiency. The points of the hooks A A are bent a little to one side for convenience in putting on the bait.

Having thus described my invention, I claim as new and desire to secure by Letters Patent—

The double-jointed fish-hook consisting of the two hooks A, pointed in opposite directions, with their points arranged to stand in close contiguity to each other, whereby they are held against being spread apart by the action of the water by the bait placed thereon, and having their shanks looped or bent into eyes around a pivot, b, while their upper ends have passed through them the line c, all constructed as shown and described, and for the purpose set forth.

FRANK DE FOREST.

Witnesses:
JOHN FRESH,
SILAS MITCHELL.